United States Patent
Larsen et al.

(10) Patent No.: US 8,063,515 B2
(45) Date of Patent: *Nov. 22, 2011

(54) COMPENSATION SYSTEM FOR POWER TRANSMISSION

(75) Inventors: Einar V. Larsen, Charlton, NY (US); Bruce E. English, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/418,003

(22) Filed: Apr. 3, 2009

(65) Prior Publication Data

US 2010/0090538 A1   Apr. 15, 2010

Related U.S. Application Data

(63) Continuation-in-part of application No. 12/249,404, filed on Oct. 10, 2008.

(51) Int. Cl.
*H02J 1/05* (2006.01)
(52) U.S. Cl. ........................................................ 307/105
(58) Field of Classification Search ................. 307/105
See application file for complete search history.

(56) References Cited

U.S. PATENT DOCUMENTS

| | | | |
|---|---|---|---|
| 3,555,291 A | 1/1971 | Dewey | |
| 3,881,137 A | 4/1975 | Thanawala | |
| 4,329,637 A * | 5/1982 | Kotake et al. | 322/20 |
| 4,843,513 A * | 6/1989 | Edris | 361/20 |
| 5,864,185 A * | 1/1999 | Neugebauer et al. | 307/105 |
| 6,021,035 A | 2/2000 | Larsen et al. | |
| 6,157,552 A | 12/2000 | Kern et al. | |
| 7,298,059 B2 | 11/2007 | Delmerico et al. | |
| 2010/0090537 A1* | 4/2010 | Larsen et al. | 307/105 |

* cited by examiner

*Primary Examiner* — Robert L. DeBeradinis
(74) *Attorney, Agent, or Firm* — James W. Pemrick; Ernest G. Cusick; Frank A. Landgraff (57) ABSTRACT

A system for compensating a power transmission grid is provided. The system includes one or more non-conventional power generating sources that are connected to the power transmission grid. At least one series compensation circuit is connected to at least a portion of the power transmission grid, to compensate the power transmission grid. At least one damping circuit is connected to at least a portion of the power transmission grid, and it mitigates subsynchronous series resonance caused by the series compensation circuit on the power transmission grid.

20 Claims, 6 Drawing Sheets

COMPENSATION SYSTEM FOR POWER TRANSMISSION

CROSS-REFERENCES TO RELATED APPLICATIONS

The present application is a continuation-in-part (CIP) of U.S. application Ser. No. 12/249,404, filed on Oct. 10, 2008, titled "Improved Compensation System For Power Transmission", the contents of which are fully incorporated by reference herein.

BACKGROUND OF THE INVENTION

The present invention relates to power transmission. More particularly, this invention relates to a system for compensation of power transmission lines.

The quality of power distributed through modern electrical distribution systems continues to be an issue concerning operators of large systems. One such power quality problem is known as voltage flicker. Voltage flicker is a voltage dip that is of a magnitude sufficient to have an objectionable effect on other loads connected to the same circuit. The disturbance may be experienced as only blinking lights, but the magnitude and the frequency of the occurrences determine flicker's impact on system users.

Figure 1:
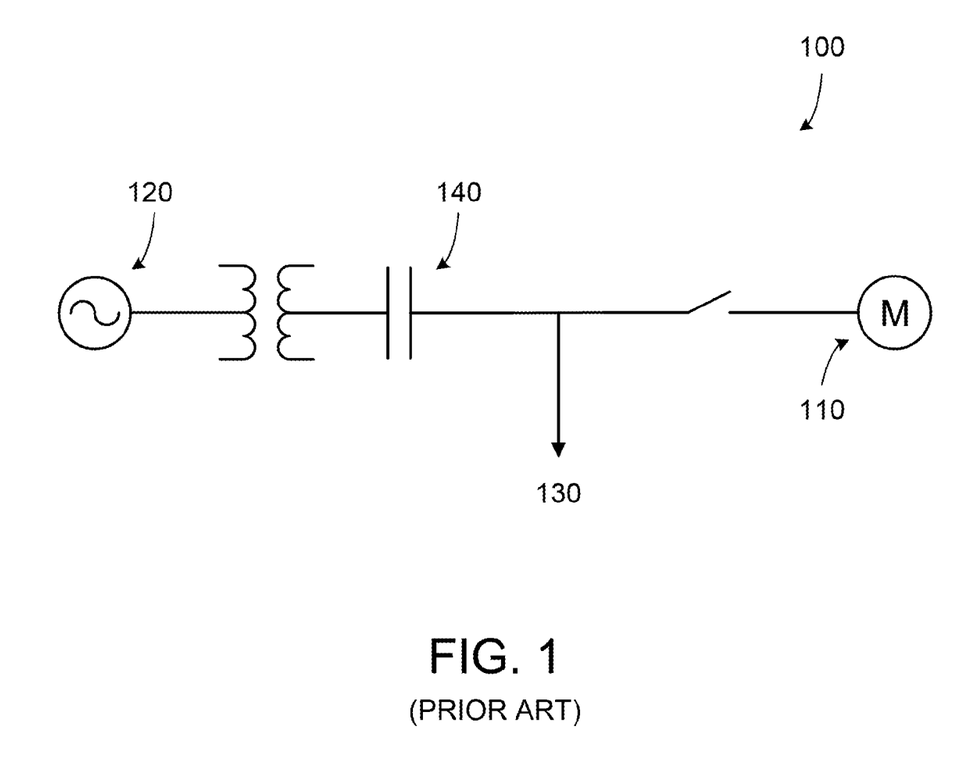
FIG. 1 illustrates a conventional voltage flicker problem in an electrical distribution system.

FIG. 1 illustrates a common voltage flicker scenario. Flicker-producing loads 110 on system 100 are typically caused by large motors, welders, or arc-furnaces. These loads are characterized by high inrush currents of relatively short duration, as experienced in the starting of a motor. The motor's inrush current is typically of a low power factor, and causes a voltage dip of increasing magnitude along the feeder up to the point of the load's connection. This causes voltage flicker problems between the load 110 and the source 120, which, when severe enough often leads to a user complaint 130.

The distribution series capacitor 140 has long been recognized as a cost-effective solution to these types of flicker problems. Unfortunately, distribution-class electrical power lines equipped with a distribution series capacitor are subject to two distinct and damaging phenomena, ferroresonance involving transformers, and self-excitation of motors during starting. Ferroresonance is an often severe and rapidly building oscillatory overvoltage condition caused by system non-linearities that can appear when power transformer cores saturate. These non-linearities interact with the series capacitor to produce a low-frequency resonant condition, often in response to large inrush currents following breaker operations. Self-excitation of induction motors is a potentially damaging condition that can occur on the same system. The term "self-excitation" refers to sub-harmonic oscillations that may occur in an electric supply circuit that includes series capacitors. The sub-harmonic oscillations result from the interaction between the series capacitors and an induction motor when the motor is in the process of starting. These oscillations are typically characterized by motor starting problems and sustained overcurrent conditions.

When ferroresonance occurs, immediate action must be taken to prevent damage to other equipment. Ferroresonance is a rapidly occurring, high magnitude, and low frequency oscillation capable of reaching power system voltage levels of 100-200% above normal for brief periods. When self-excitation occurs, low-frequency oscillations are produced as the motor starting sequence fails. The motor will search for the proper operating frequency, which will cause large current surges as the shaft acceleration alternates.

Power generation sites (e.g., thermal prime movers, induction generators, wind turbines, etc.) are often located very far from load centers. To enable the transmission of power over long distances, the use of series capacitors is often employed to raise the power limits of the resulting long transmission lines. The series capacitors can cause series-resonant oscillations, which have been known to cause damage to generator shafts. Damage could also be inflicted on wind turbine power transmission and control components.

The series-resonant oscillations occur at a sub-harmonic of the supply frequency (typically 60 Hz in North America). This effect has become known as subsynchronous resonance (SSR). The most famous incident involving SSR occurred in 1970 and again in 1971 at the Mohave Generating Station in southern Nevada, USA. A generator experienced a gradually growing vibration that eventually led to a fracture of the shaft section between the generator and the rotating exciter. Investigations determined that an electrical resonance at 30.5 Hz produced torque at 29.5 Hz (the 60 Hz compliment frequency), which was near coincident with the frequency of the second torsional vibration-mode of the turbine-generator at 30.1 Hz. This interaction between the series capacitors and the torsional system is an example of subsynchronous resonance.

Wind turbines and wind farms are becoming increasingly popular and are being installed in greater numbers around the world. The best locations for wind farms are often located far from load centers. In addition, multiple wind farms may need to be connected to an existing electrical grid that may also connect to thermal generation stations (e.g., gas or steam turbines driving one or more generators).

BRIEF SUMMARY OF THE INVENTION

According to one aspect of the present invention, a system for compensating a power transmission grid is provided. The system includes one or more non-conventional power generating sources that are connected to the power transmission grid. At least one series compensation circuit is connected to at least a portion of the power transmission grid, to compensate the power transmission grid. At least one damping circuit is connected to at least a portion of the power transmission grid, and it mitigates subsynchronous series resonance caused by the series compensation circuit on the power transmission grid.

DETAILED DESCRIPTION OF THE INVENTION

The modern utility grid is evolving into a network that includes disparate generation sources located far from load centers. Multiple wind farms, solar power generating stations, and other non-conventional power sources are being connected to the existing power transmission lines. Different suppliers manufacture wind turbines and each supplier can manufacture their wind turbines with different operating characteristics. Solar power suffers the same problem. This wide variability in operating characteristics makes it difficult to connect these non-conventional power-generating sources to the existing transmission lines.

Figure 2:
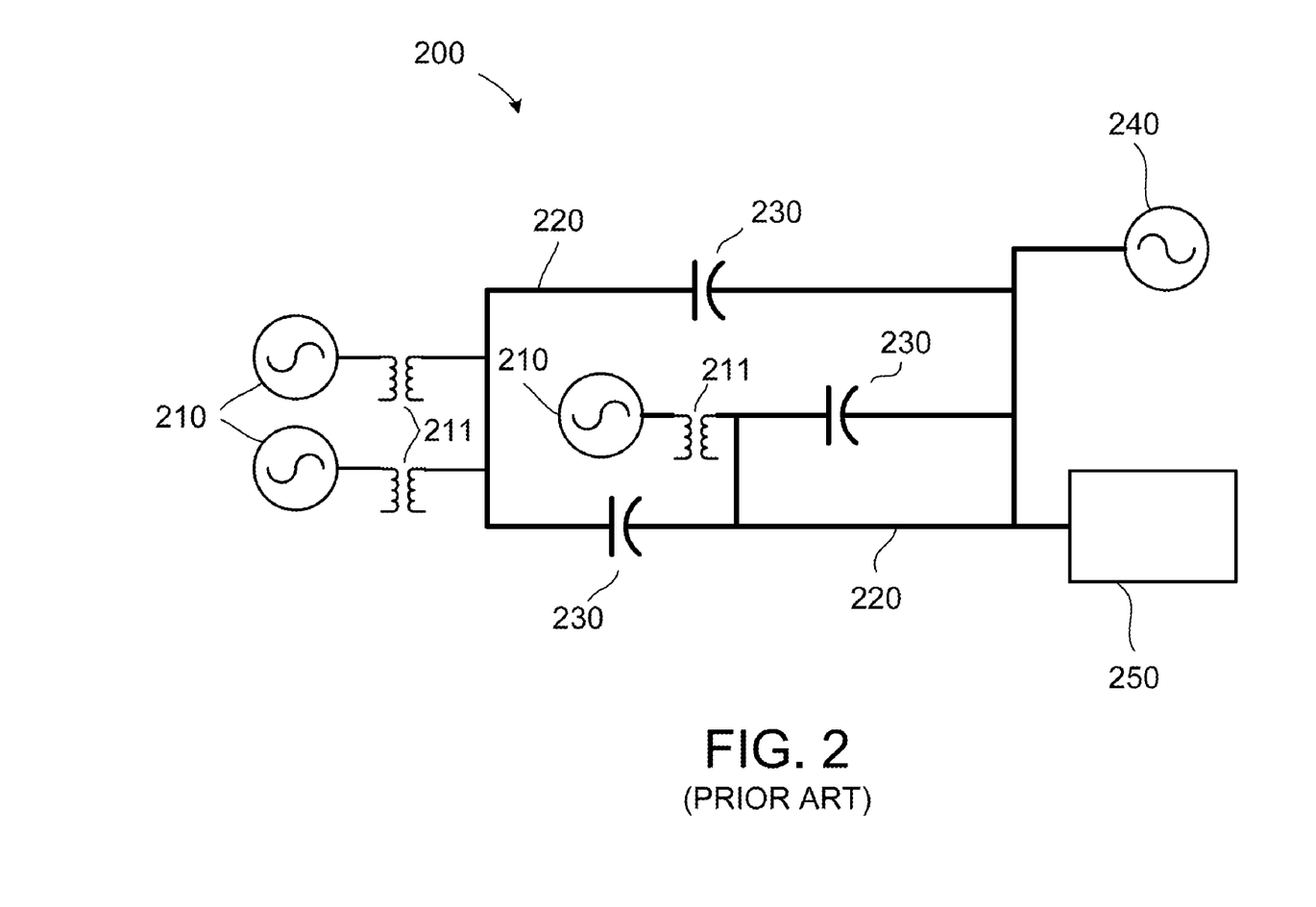
FIG. 2 is a simplified schematic illustration of one known power grid.

FIG. 2 illustrates a simplified example of one typical utility grid 200. One or more non-conventional generating sources 210 can be connected to various parts of the grid through power transformers 211. The non-conventional generating sources 210 can comprise various types of prime movers (e.g., wind turbines, wind farms, solar generating stations, etc.), and may be characterized by non-conventional electrical interfaces to the grid.

The non-conventional electrical interfaces may include induction generators or power electronic systems that can interact adversely with lightly damped series resonances in the transmission grid. The non-conventional generating sources 210 can comprise individual sources (e.g., a single wind turbine) or a group of sources (e.g., a wind farm comprising many turbines). Individual wind turbines may have power ratings of about 1.5 to about 3.0 MW or more, and wind farms may have a collective power rating of about 100 to about 500 MW or more. These ranges are for illustrative purposes only and may extend above or below the ranges given.

The grid 200 may also include one or more conventional generating sources 240 and one or more loads 250. Conventional generating sources typically comprise synchronous machines and may have power ratings of about 100 MW to 1300 MW or more per machine. An example of a conventional generating source is a gas or steam powered turbine that drives an electrical generator.

The series capacitors 230 are required in long transmission lines 220 to compensate for the inherent inductive reactance. The disadvantage to series compensation is that it creates lightly damped series resonances having frequency below the synchronous frequency (i.e., subsynchronous). The non-conventional generators 210 can interact with the lightly damped series resonances in the transmission lines 220 in a number of ways, which can cause damage to the non-conventional generating sources 210.

The simplest form of non-conventional generation is a wind turbine using a simple induction generator. Radial transmission of large amounts of induction-generated electrical power through series-compensated lines is new to modern power systems because of the rise of wind power. With this new power source comes potential problems, among these problems is a specific subsynchronous phenomenon known as induction generator effect (IGE). The root cause of this effect is that induction machines appear as a negative resistance to electrical oscillations having frequency less than that induced by the rotor speed. When a series capacitor is added to the network, then the resulting subsynchronous series resonance with the inherent inductance of the network will be destabilized by the induction-generator negative resistance effect and can lead to an electrical instability.

Other types of non-conventional generation rely extensively on power electronics to convert power from the prime mover to the electrical characteristic needed by the grid. Power electronics inherently require several complex control algorithms operating at high speed to perform their function. Due to the high-speed nature of the algorithms, there will be substantial interaction with the subsychronous series resonance of the transmission grid that is created by series compensation. These control algorithms are designed based upon a simplified assumption of grid characteristics. It is impractical to design such algorithms to accommodate any arbitrary grid characteristic. Further, the details of these algorithms that govern the interaction phenomena vary with manufacturer and are typically considered highly proprietary.

A transmission line owner/operator may expend a large amount of labor and expense to individually tailor their transmission line to each disparate power source. Alternatively, the developers of each non-conventional power generating station must work in great detail with the vendor(s) of their generating equipment and with the vendor(s) of other non-conventional generating equipment to coordinate their operating characteristics to accommodate the transmission grid. Such coordination is not only extremely onerous and expensive to achieve, but is prohibited by existing regulations governing competitive generation markets.

An aspect of the present invention provides a transmission-compensation system that can couple multiple disparate generation sources to a common electrical grid, without the requirement for extensive coordination between generating stations, or requiring expensive and difficult efforts by the transmission system operator. Further aspects of the system of the present invention provide for damping subsynchronous series resonance at the series capacitor location.

Figure 3:
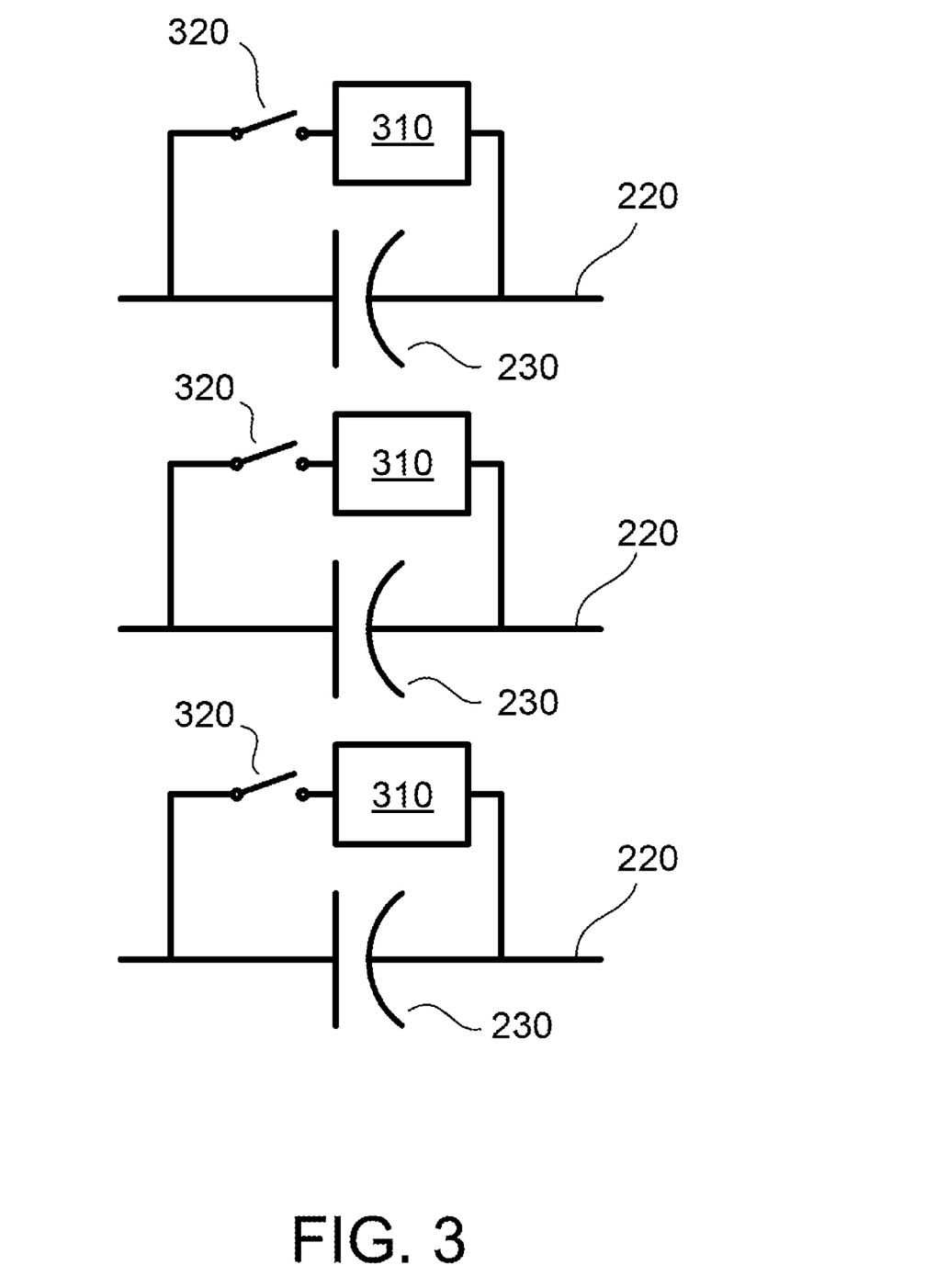
FIG. 3 is a simplified schematic diagram of the compensation circuit according to one aspect of the present invention.

FIG. 3 illustrates an improved series compensation circuit according to one aspect of the present invention. The transmission line 220 is series compensated by series capacitor 230. However, a parallel damping circuit 310 is placed in parallel with capacitor 230. The damping circuit can be broadly tuned to decrease or eliminate subsynchronous resonance caused by capacitor 230. In addition, a switch 320 may also be placed in series with damping circuit 310. The switch 320 can isolate the damping circuit in case of failure or for system maintenance. It is to be understood that a switch 320 could be placed on both sides of damping circuit 310 if desired.

Figure 4:
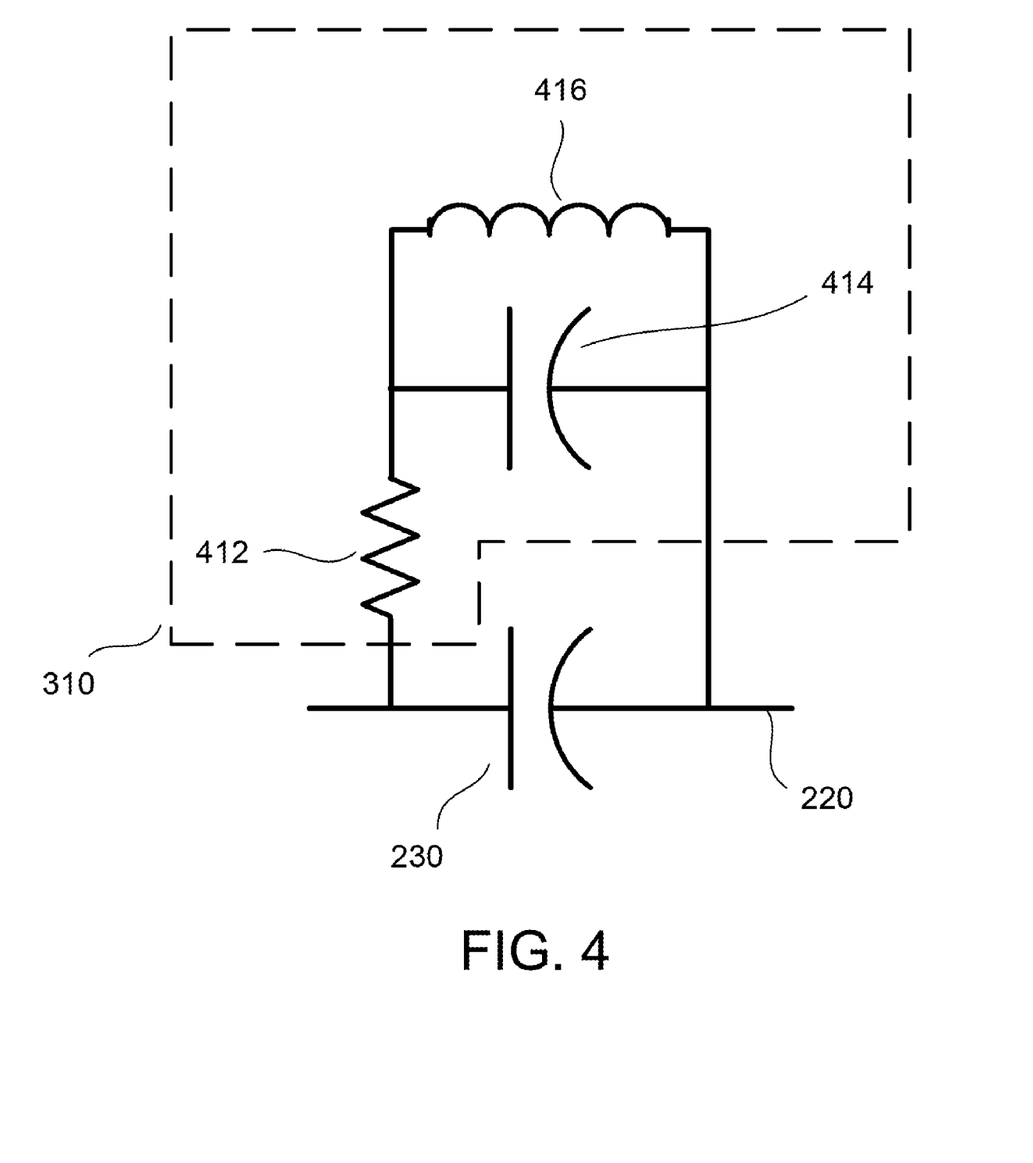
FIG. 4 is a simplified schematic diagram of the damping circuit according to one aspect of the present invention.

FIG. 4 illustrates a schematic circuit diagram of one embodiment of damping circuit 310, according to aspects of the present invention. The damping circuit is comprised of resistor 412, capacitor 414 and inductor 416. The damping circuit can be placed in parallel with the series compensation capacitor 230 or transmission line 220. Switch 320 is optional and not shown in this embodiment.

The resistor 412 damps the subsychnronous series resonance caused by capacitor 230. A capacitor 414 and inductor 416 are connected in parallel, and in series with resistor 412. The capacitor 414 and inductor 416 block current in resistor 412 at the synchronous frequency and reduce losses, which would have been attributed to resistor 412. The passive components of the damping circuit are tuned for a broadband response, to compensate for all types of non-conventional power generating sources 210, which may be connected to transmission line 220.

Figure 5:
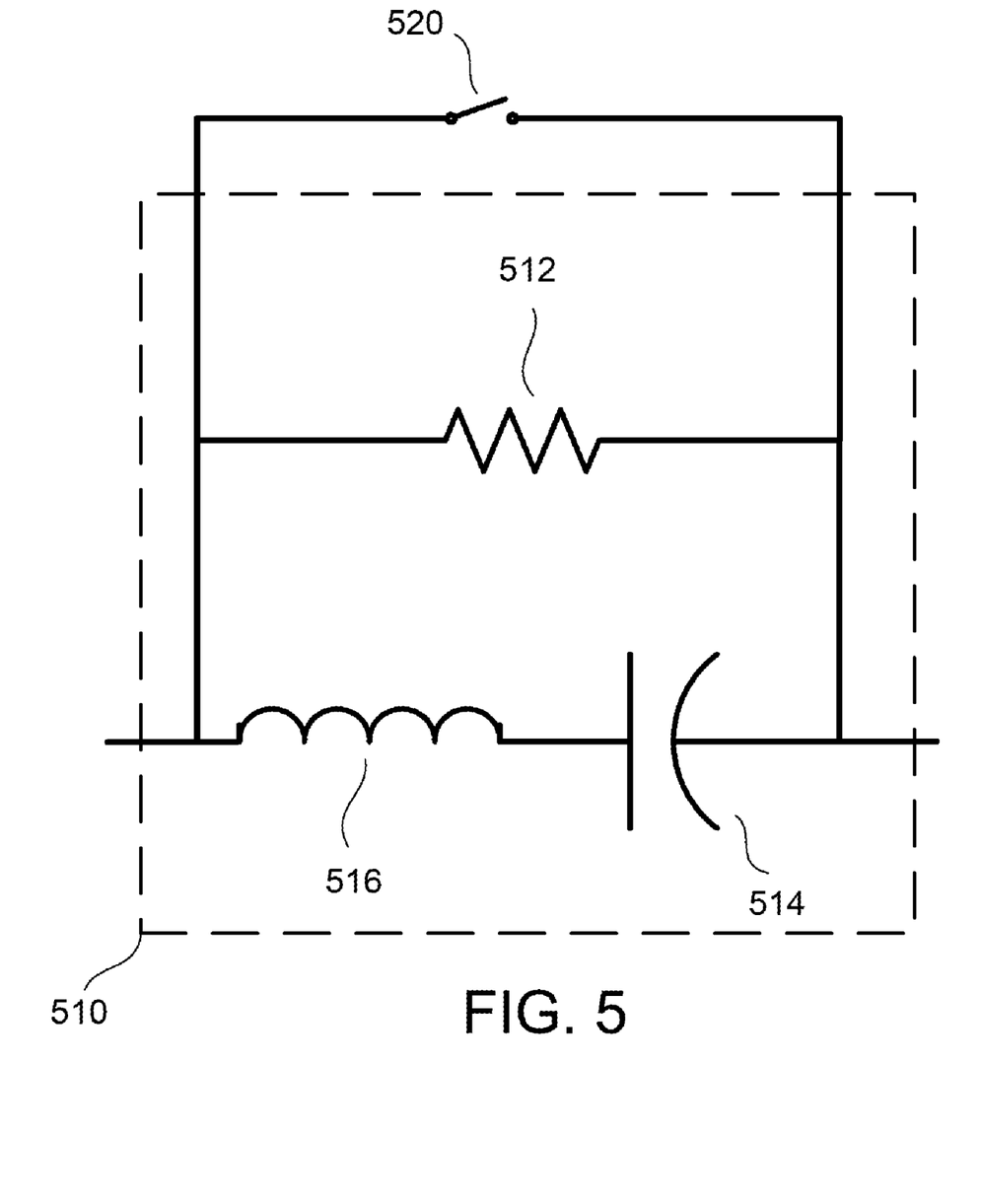
FIG. 5 is a simplified schematic diagram of the damping circuit according to another aspect of the present invention.

FIG. 5 illustrates a schematic circuit diagram of a damping circuit 510, according to another aspect of the present invention. The damping circuit 510 is comprised of resistor 512, capacitor 514, and inductor 516. This damping circuit can be placed in series with a series compensation capacitor 230, and/or a series compensated or uncompensated transmission line 220, and/or between the power transformer 211 of the non-conventional source 210 and the bus (on the higher and/or lower voltage side of this transformer), and/or between the neutral point of power transformer 211 and ground (one the higher and/or lower voltage side of this transformer).

The resistor 512 damps the subsychronous series resonance caused by capacitor 230. A capacitor 514 and inductor 516 bypass current around resistor 512 at the synchronous frequency and reduce losses, which would have been attributed to resistor 512. The passive components of the damping circuit are tuned for a broadband response, to compensate for all types of non-conventional power generating sources 211, which may be connected to transmission line 220.

The bypass switch 520 can protect the damping circuit from system currents in case of failure or for system maintenance. It is to be understood that switch 520 could be a series of switches that not only bypasses damping circuit 510, but also electrically isolates it from the system through a set of disconnects, bypass connections, and or grounding blades.

Figure 6:
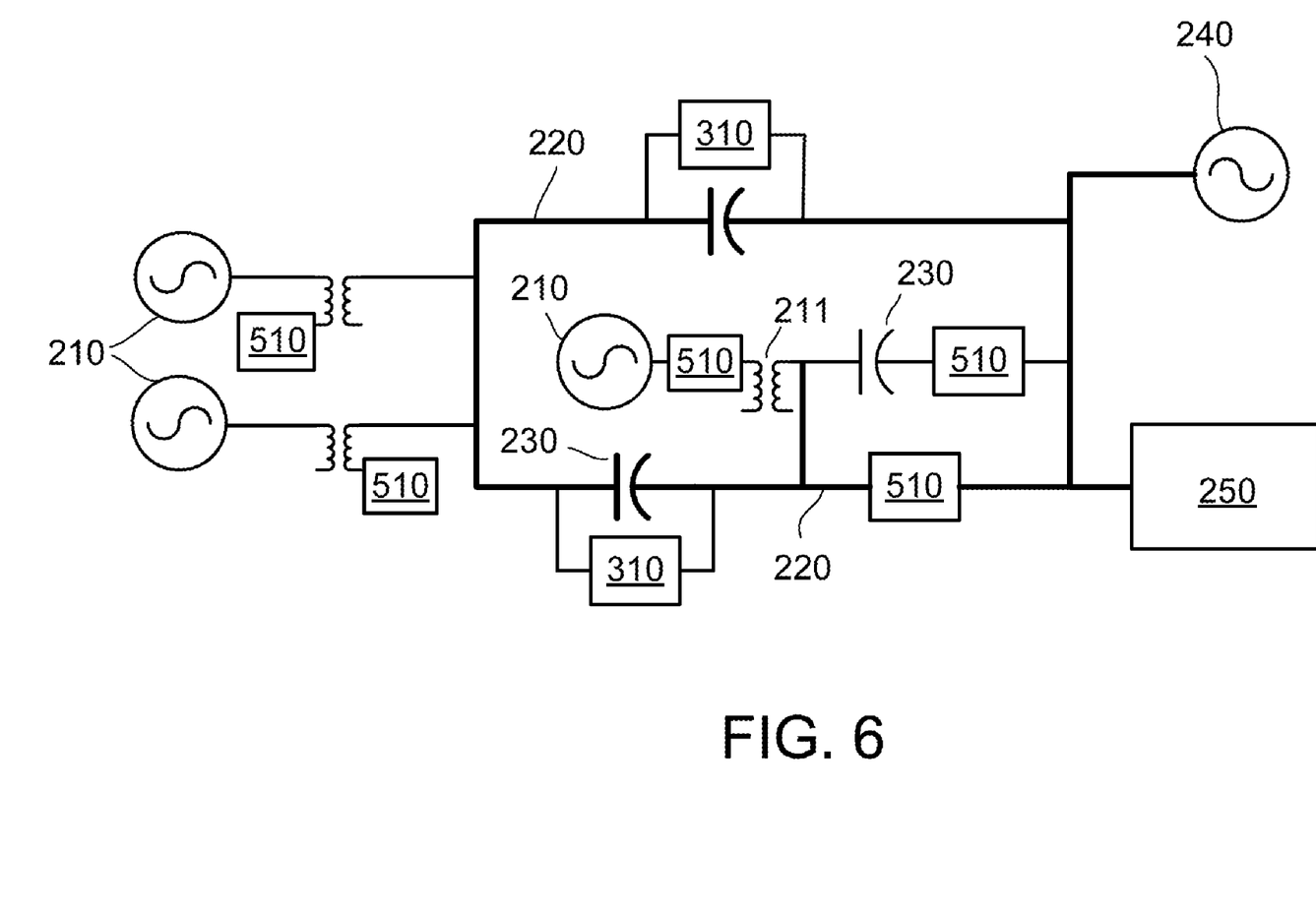
FIG. 6 is a simplified schematic diagram a power grid incorporating the compensation and damping circuit according to a still further aspect of the present invention.

FIG. 6 illustrates a simplified schematic of a utility grid incorporating aspects of the present invention. The damping circuit 310 is shown connected in parallel to some of the series capacitors 230. The damping circuit 510 is shown connected in series to some of the series capacitors 230, uncompensated lines 220, between power transformers 211 and the higher or lower voltage buses, and between the transformer 211 neutral points and ground on the higher or lower voltage sides of those transformers. The damping circuits 310 and/or 510 may be a single or multiple (e.g., 2 or 3) phase version of damping circuit 310 and/or 510. Switches 320 and or 520 (not shown in FIG. 6) may also be included in damping circuit 310 and or 510. The damping circuit(s) 310 and/or 510 protect(s) the non-conventional power generating sources 210 from damage due to subsynchronous resonance.

Many transmission lines are configured as 3-phase lines, and the damping circuit of the present invention could be placed on one, two or all three phases. The passive components of the damping circuit could also be configured in a variety of ways. In the figures a resistor is shown connected in series to a capacitor and inductor connected in parallel. However, the resistor 412 could be replaced by a resistor connected in series with an inductor, a resistor connected in series with an inductor and capacitor, a resistor connected in parallel with a series connected inductor and capacitor, and other suitable configurations. The damping circuit could also be configured as a parallel connected resistor, inductor and capacitor. Other suitable or equivalent circuit configurations could also be employed.

The switch 320 could also be configured to switch to a backup damping circuit if the primary damping circuit 310 fails. In this embodiment, two or more damping circuits could be connected in parallel, but isolated via one or more switches. If a primary damping circuit failed, a local or remote control signal could be activated to operate one or more switches to disconnect the failed primary damping circuit, and switch in a secondary or backup damping circuit. The control of the switches could also be performed locally as well.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for compensating a power transmission grid, comprising:
   one or more non-conventional power generating sources, said one or more non-conventional power generating sources connected to said power transmission grid;
   at least one series compensation circuit connected to at least a portion of said power transmission grid, said at least one series compensation circuit compensating said power transmission grid;
   at least one damping circuit connected to at least a portion of said power transmission grid, the at least one damping circuit tuned for a broadband response to compensate for the one or more non-conventional power generating sources;
   wherein, said at least one damping circuit mitigates subsynchronous series resonance caused by said at least one series compensation circuit on said power transmission grid.

2. The system of claim 1, wherein said at least one damping circuit is tuned to provide a broadband response to subsynchronous resonance.

3. The system of claim 1, wherein said at least one damping circuit is tuned to have a low impedance at an operating frequency of said power transmission grid.

4. The system of claim 1, wherein said at least one damping circuit is tuned to have a large resistive impedance at series resonance frequencies of said power transmission grid.

5. The system of claim 1, wherein said at least one damping circuit is connected in series with said at least one series compensation circuit.

6. The system of claim 1, wherein said at least one damping circuit is connected in series with at least a portion of said power transmission grid.

7. The system of claim 1, further comprising:
   one or more power transformers connected to at least one of said one or more non-conventional power generating sources;
   wherein said at least one damping circuit is connected to said one or more power transformers.

8. The system of claim 7, wherein said at least one damping circuit is connected between at least one of said one or more power transformers and at least one of said one or more non-conventional power generating sources.

9. The system of claim 7, wherein said at least one damping circuit is connected between at least one of said one or more power transformers and at least one of a higher and lower voltage bus.

10. The system of claim 7, wherein said at least one damping circuit is connected between a neutral point and a lower or higher voltage side of at least one of said one or more power transformers.

11. The system of claim 1, further comprising:
    at least one conventional power generating source connected to said power transmission grid.

12. The system of claim 11, wherein said at least one conventional power generating source is of the synchronous machine type.

13. The system of claim 1, wherein said one or more non-conventional power generating sources are selected from one or more of the group comprising:
    a wind turbine, a wind farm, a solar power generating station.

14. The system of claim 1, wherein said at least one compensation circuit comprises at least one series capacitor.

15. The system of claim 1, wherein said at least one damping circuit comprises at least one resistor connected in parallel with a series-connected capacitor and inductor.

16. The system of claim 1, further comprising:
    at least one switch, said at least one switch connected to said at least one damping circuit;

wherein, operation of said at least one switch can connect or disconnect said at least one damping circuit from said power transmission grid.

17. The system of claim 16, further comprising:
two or more damping circuits connected in parallel;
means for electrically isolating said two or more damping circuits from each other, and for selectively connecting one or both of said damping circuits to said at least one compensation circuit;
wherein, one of said damping circuits is a primary damping circuit and another of said damping circuits is a backup damping circuit.

18. The system of claim 1, said power transmission grid comprising one or more phases, said at least one compensation circuit connected to at least one of said one or more phases, wherein, said at least one damping circuit is connected to at least one phase of said power transmission grid.

19. The system of claim 1, said power transmission grid comprising at least one phase, said at least one compensation circuit connected to said at least one phase, wherein, said at least one damping circuit is connected to said at least one phase of said power transmission grid.

20. The system of claim 1, said power transmission grid comprising a plurality of phases, said at least one compensation circuit connected to said plurality of phases, wherein, said at least one damping circuit is connected to said plurality of phases of said power transmission grid.

* * * * *